United States Patent
Kidd et al.

(10) Patent No.: US 7,386,607 B2
(45) Date of Patent: Jun. 10, 2008

(54) SYSTEM USING STATE CHANGE REQUESTS RECEIVED OVER A NETWORK TO CHANGE CURRENT STATE OF A NETWORK DEVICE TO A DESIRED STATE AT A PARTICULAR TIME

(75) Inventors: Nelson F. Kidd, Tigard, OR (US); Bryan Y. Roe, Camas, WA (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1074 days.

(21) Appl. No.: 10/750,171

(22) Filed: Dec. 31, 2003

(65) Prior Publication Data

US 2005/0149629 A1 Jul. 7, 2005

(51) Int. Cl.
*G06F 15/177* (2006.01)
(52) U.S. Cl. ...................... 709/221; 709/220
(58) Field of Classification Search ................ 709/200, 709/201; 379/201.01; 714/10
See application file for complete search history.

(56) References Cited

U.S. PATENT DOCUMENTS

| 5,386,552 A * | 1/1995 | Garney ........................ 714/10 |
| 6,970,547 B2 * | 11/2005 | Andrews et al. ....... 379/210.01 |
| 2002/0161862 A1 * | 10/2002 | Horvitz ...................... 709/220 |
| 2003/0131077 A1 * | 7/2003 | Hogan ........................ 709/220 |
| 2003/0172136 A1 * | 9/2003 | Katagawa et al. .......... 709/220 |
| 2003/0172138 A1 * | 9/2003 | McCormack et al. ....... 709/220 |
| 2004/0024852 A1 * | 2/2004 | Chen et al. ................. 709/220 |
| 2005/0108366 A1 * | 5/2005 | Bodin et al. ................ 709/220 |

* cited by examiner

*Primary Examiner*—Le Hien Luu
(74) *Attorney, Agent, or Firm*—Robert A. Diehl

(57) ABSTRACT

A serialized stream of state change requests are received over a network for a network device. The network device has a current state object representing a current state of the network device. A desired state object is modified with each of the state change requests in the serialized stream. The desired state object represents a desired state for the network device. An instance of the desired state object is read at a particular instant in time. The instance of the desired state object is compared to the current state object. A set of tasks are determined to change the current state of the network device to the desired state based on the comparison.

33 Claims, 7 Drawing Sheets

SYSTEM USING STATE CHANGE REQUESTS RECEIVED OVER A NETWORK TO CHANGE CURRENT STATE OF A NETWORK DEVICE TO A DESIRED STATE AT A PARTICULAR TIME

FIELD OF THE INVENTION

The present invention relates to the field of networking. More specifically, the present invention relates to handling state change requests for a network device.

BACKGROUND

A network can connect various components and devices together so that the components and devices can communicate. For instance, the Internet is a network of networks that allows a virtually limitless number of computers to share information and resources, provide services, etc. Networks can be quite useful on a smaller scale as well. For example, networks are increasingly used in the home to connect a variety of devices, such as home computers, printers, household appliances, environmental systems, and network-ready home theater components like televisions, digital versatile disk (DVD) players, satellite turners, etc.

By networking devices such as these, it may be possible to control one or more of the devices remotely through the network from any of a variety of control points. A common example of a remotely controlled device is a computer with a printer coupled to it. If the computer is connected to a network, another computer on the network may be able to request that the computer print a file by sending both the request and the file through the network. Similarly, a computer, or some other device, may be able to request a home theater to do a variety of actions, such as play a DVD or even download content from a server that is accessible through the network. These requests are often called state change requests. For instance, in response to a state change request, a DVD player may change its state from STOP to PLAY.

As useful as networks are, they can present some challenges when it comes to remotely controlling a device through a network. For example, most DVD players include buttons for PLAY, STOP, PAUSE, NEXT, and PREVIOUS. To control the DVD player through a network, a control point may include the same functions, possibly in the form of icons in a graphical user interface on a personal computer.

A user can expect an almost instantaneous response when pressing the buttons on the DVD player. For instance, skipping forward several tracks by repeatedly pressing the NEXT button may take just a couple of seconds. The response time through the network, however, can be less predictable and less reliable. The amount of other traffic on the network, interference in a wireless network, software crashes, and countless other factors may delay a state change request. Skipping forward several tracks may take several times as long through the network compared to the buttons on the DVD player.

The situation becomes even less predictable and less reliable when not only the control point is remote, but the content is remote as well. That is, rather than playing a DVD in the DVD player, the DVD player may be capable of downloading music and movies over the network from a server. In which case, both the request and the content may be delayed in the network.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention provide an inventive approach for handling state change requests. Embodiments of the present invention can significantly improve the response time for processing streams of state change requests. Many prior approaches process requests in a serial and synchronous manner, executing every request to completion before beginning the next request. If a burst of requests are received faster than they can be completed, many prior approaches queue the requests and process them one at a time out of the queue.

In contrast, embodiments of the present invention maintain a desired state object (DSO), and accumulate the effects of state change requests in the DSO. Then, when the network device is ready to change state, embodiments of the present invention can change the state of the network device directly to the desired state, potentially processing the equivalent of multiple state change requests all at once by bypassing intermediate states.

Figure 1:
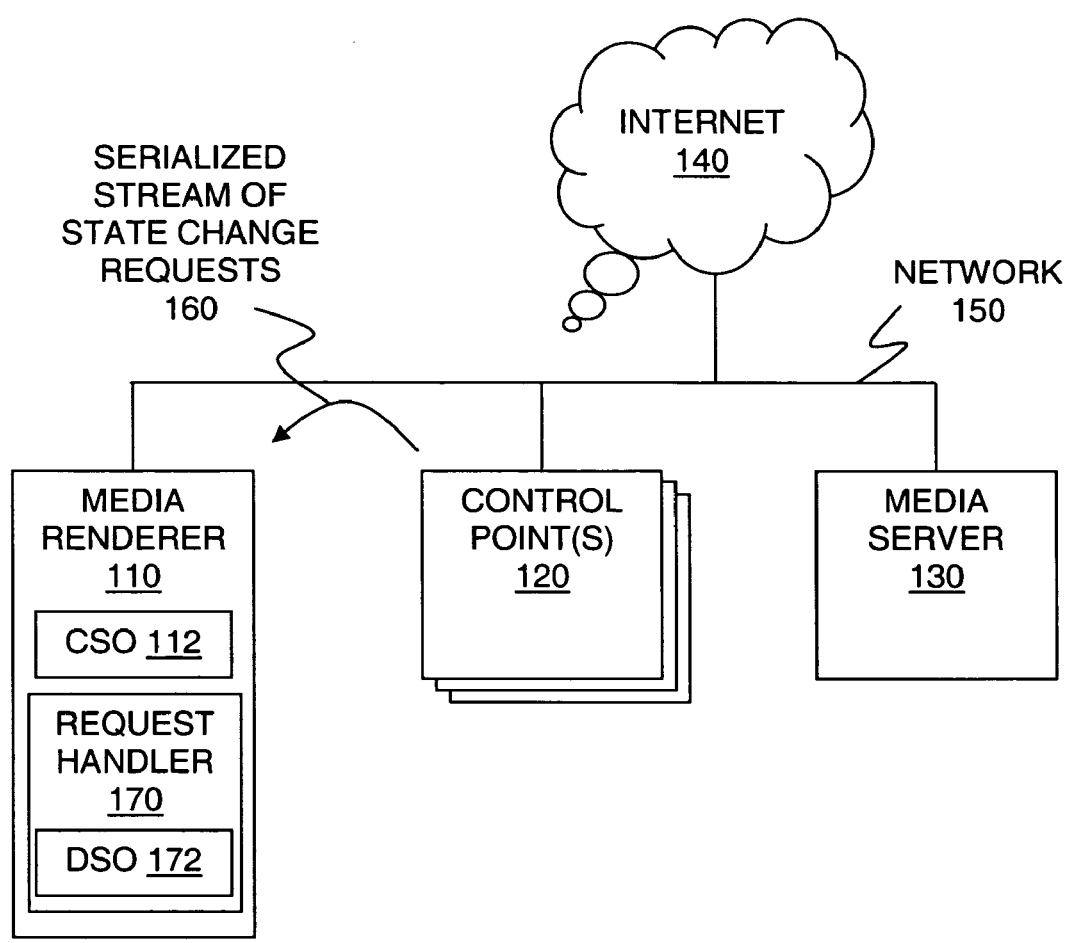
FIG. 1 illustrates one embodiment of a network environment.

FIG. 1 illustrates one example of a network environment in which embodiments of the present invention can be used.

A media renderer 110, one or more control points 120, a media server 130, and the Internet 140 are coupled together by network 150. Control point(s) 120 can remotely control media renderer 110 through network 150 with state change requests 160. In response to the state change requests 160, media renderer 110 can access and process content on media server 130.

The current state of media renderer 110 at any instant in time is represented by a current state object (CSO) 112. That is, current state object 112 defines what content, if any, is being processed by media renderer 110, and, if so, how the content is being processed. CSO 112 can take any number of forms. For example, in one embodiment, CSO 112 can be a data structure with data fields corresponding to the set of state variables that define the current state of the media renderer. In another embodiment, CSO 112 is the actual state of various components within the media renderer. In which case, to view the current states of the media renderer, the actual states of the various components can be pulled to coble together the content of the CSO.

Media renderer 110 also includes request handler 170. The state change requests 160 arrive at request handler 170 in a serialized stream. That is, at some point before request handler 170, the requests are placed in single file so that only one request is received at a time. Any number of approaches can be used to serialize the requests. This can be done at the network level by, for instance, only allowing one control point to access the media renderer at a time.

The serialized stream 160, however, can be asynchronous. That is, requests can be received in bursts or flurries. For example, a user could generate a burst of NEXT requests by rapidly pressing a NEXT button.

Request handler 170 maintains a desired state object (DSO) 172 as the requests 160 are received. DSO 172 can take any number of forms. In one embodiment, DSO 172 can be a data structure similar to the data structure that can be used for CSO 112, with data fields corresponding to the set of state variables that define the current state of the media renderer. But, instead of storing the current state of the media renderer, DSO 172 can store the desired state of the media renderer. Since DSO 172 can be nothing more than a set of data, it can be updated almost instantly as requests 160 arrive. In other words, DSO 172 represents the state that media renderer 110 would have if the media renderer could process all the requests as fast as they are received. Unfortunately media renderer 110 is unlikely to always be able to process all of the requests 160 as fast as they are received. In which case, request handler 170 can create the illusion of faster response time by essentially skipping intermediate requests.

Media renderer 110, control point(s) 120, and media server 130 can take any number of forms. For example, they may comprise hardware, firmware, software, or any combination of hardware, firmware, and software as stand-alone devices or embedded devices in larger systems. They may be three different applications, all running on the same machine, or spread out among two or more machines.

In particular, media renderer 110 represents a wide variety of network devices, such as a television, a radio receiver, a digital versatile disk (DVD) player, a compact disk (CD) player, a video cassette recorder (VCR), an audio tape player, a personal computer, a personal data assistant, and a MP3 (Moving Picture Experts Group (MPEG)-1, Audio Layer 3) player, and the like. In one embodiment, renderer 110 is a Universal-Plug-and-Play (UPnP) device. Other embodiments of the inventive request handler can be used in any number of remotely controlled network devices, and the network devices need not be limited to those that render media. Furthermore, CSO 112, request handler 170, and DSO 172 may be arranged and/or combined differently within renderer 110 or distributed among multiple devices.

Network 150 represents a wide variety of networks, such as a wide area network, a local area network, and a system-level network within a device. Alternately, network 150 could be part of the Internet 140.

The state change requests 160 can take any of a number of forms. In one embodiment, requests 160 can be UPnP requests. UPnP requests are based on a number of actions and state variables. In the case of audio/video (AV) UPnP requests, the actions can include play, stop, pause, next, previous, increase/decrease volume, increase/decrease brightness, increase/decrease contrast, toggle mute, access playlist URI (universal resource identifier), increase/decrease red/black/green/blue levels, increase/decrease play speed, and the like. Similarly, the state variables can include last action, track number, volume, brightness, contrast, mute, current playlist, red/black/green/blue levels, play speed, and the like. In which case, the DSO may include a number of fields, each corresponding to one or more of the actions and state variables.

Figure 2:
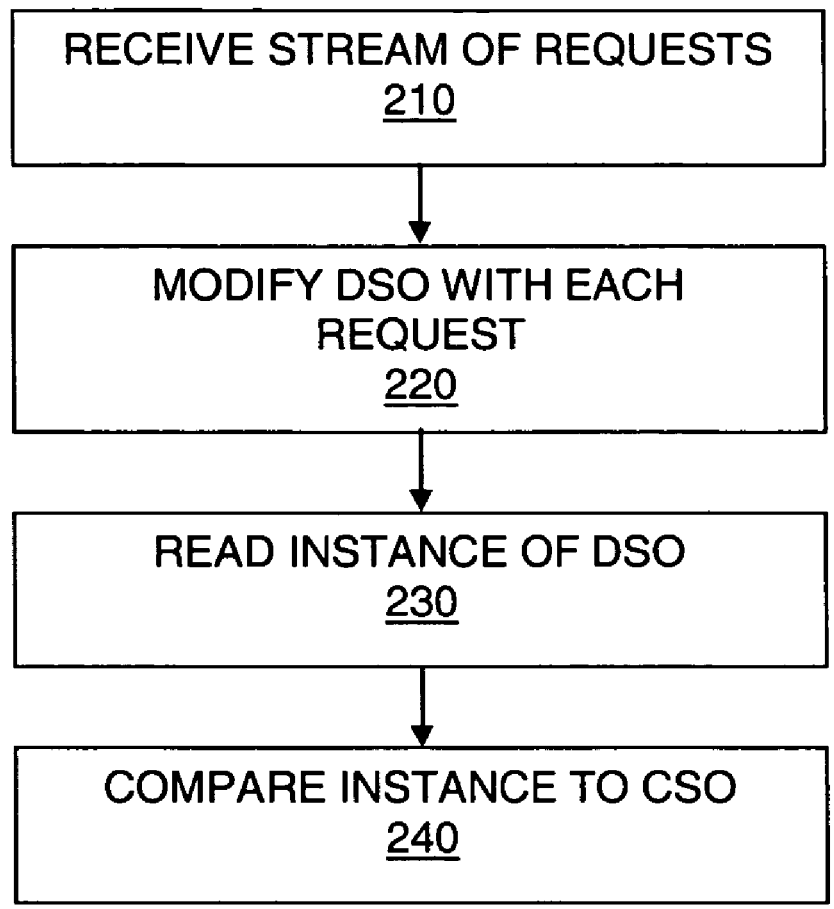
FIGS. 2-6 illustrate various embodiments of handling state change requests.

FIG. 2 illustrates the process of one embodiment of the present invention at a high level. At 210, the process receives a serialized stream of state change requests over a network for a network device. At 220, the process modifies a desired state object (DSO) with each of the state change requests. At 230, the process reads an instance of the DSO at a particular instant in time. And, at 240, the process compares the instance of the DSO to a current state object for the network device.

Figure 3:
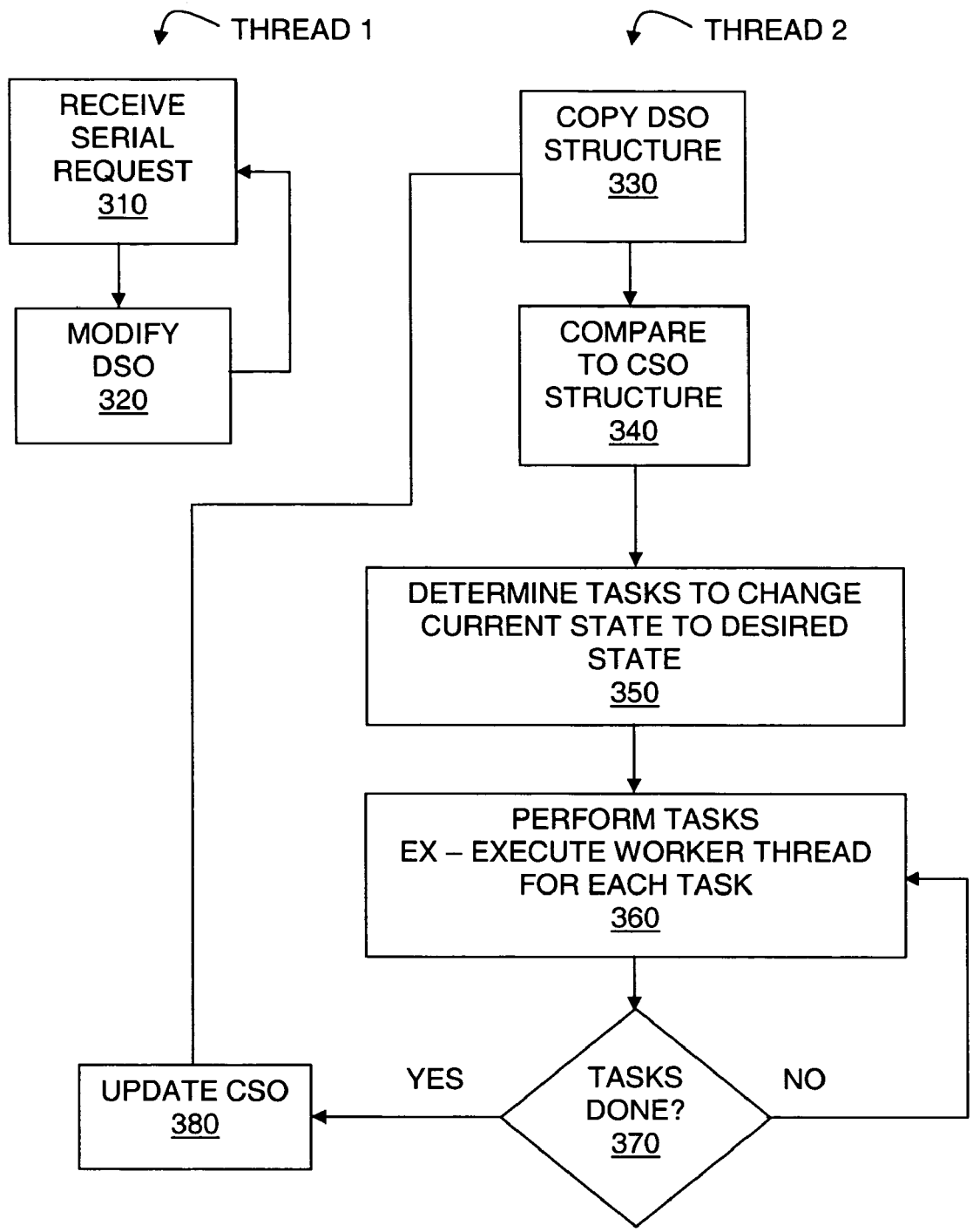

FIGS. 3 through 6 illustrate a number of processes for various embodiments of the present invention in more detail. Referring to FIG. 3, an embodiment of the present invention is illustrated as two processes, or threads, that execute simultaneously. Thread 1 maintains the DSO. Specifically, at 310, thread 1 receives a serial state change request, and, at 320, thread 1 modifies the DSO with the request. Then thread 1 loops back to 310 to repeat the process as additional requests are received.

Thread 2, meanwhile, copies the DSO data structure at 330. At 340, thread 2 compares the copy of the DSO data structure to the data structure of the CSO. Based on the comparison, thread 2 determines a set of tasks to perform to change the current state to the desired state at 350. The set of tasks could involve multiple state changes to the current state. Then, at 360, thread 2 begins performing the set of tasks. In one embodiment, to lighten the processing load on thread 2, thread 2 can initiate execution of any of a number of separate worker threads that actually perform the tasks. At 370, thread 2 checks if the tasks are done. If not, thread 2 loops back to 360 to perform more tasks. If the tasks are all done at 370, thread 2 updates the CSO with the current state at 380 and loops back to 330.

While thread 2 was busy with its tasks, thread 1 may have updated the DSO with any number of state change requests. If so, thread 2 will proceed to update the current state to equal the desired state. On the other hand, if DSO has not been changed since the last iteration of thread 2, thread 2 may generate an empty set of tasks at 350 and simply iterate through the rest of the thread without making any state changes.

In the two-thread embodiment of FIG. 3, both thread 1 and thread 2 can access the DSO. Thread 1 writes to the DSO and thread 2 reads from the DSO. If both threads are allowed to access the DSO at the same time, a variety of errors could be introduced into the system. Any number of approaches can be used to prevent simultaneous accesses.

Figure 4:
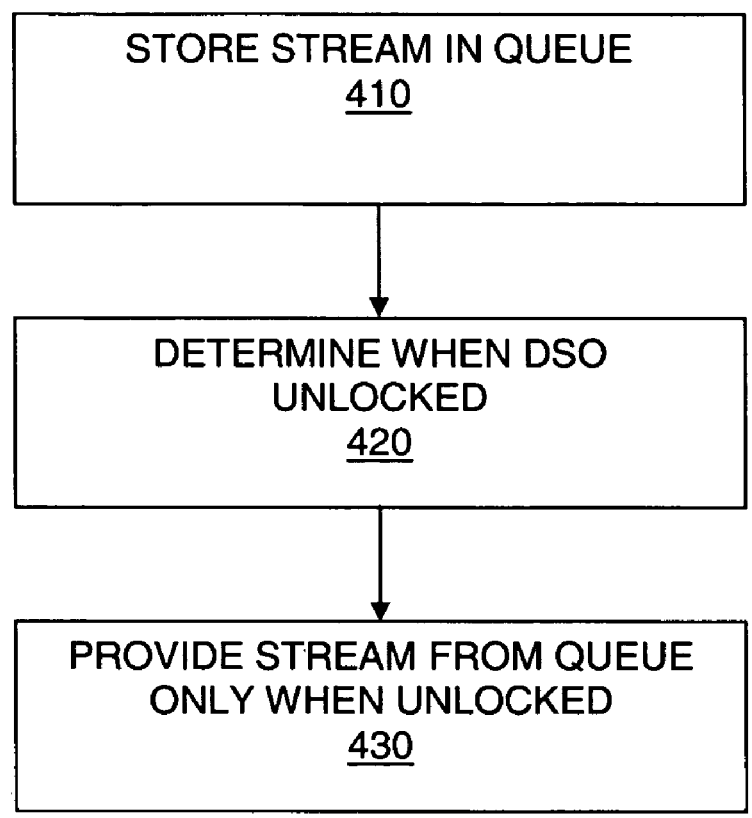

FIG. 4 illustrates one embodiment of a process for protecting the DSO from thread 1 initiating a write while thread 2 is currently reading. At 410, the process stores the stream of requests to a queue as the requests are received. At 420, the process determines when the DSO is unlocked. That is, when thread 2 is accessing the DSO, the DSO is inaccessible to thread 1. At 430, the process only provides the stream of requests when the DSO is unlocked. Without the queue, the request handler may drop a request if the request is received when the DSO is locked. Reading the DSO can be very quick, however, so a small queue with room for just a few requests may be adequate.

Figure 5:
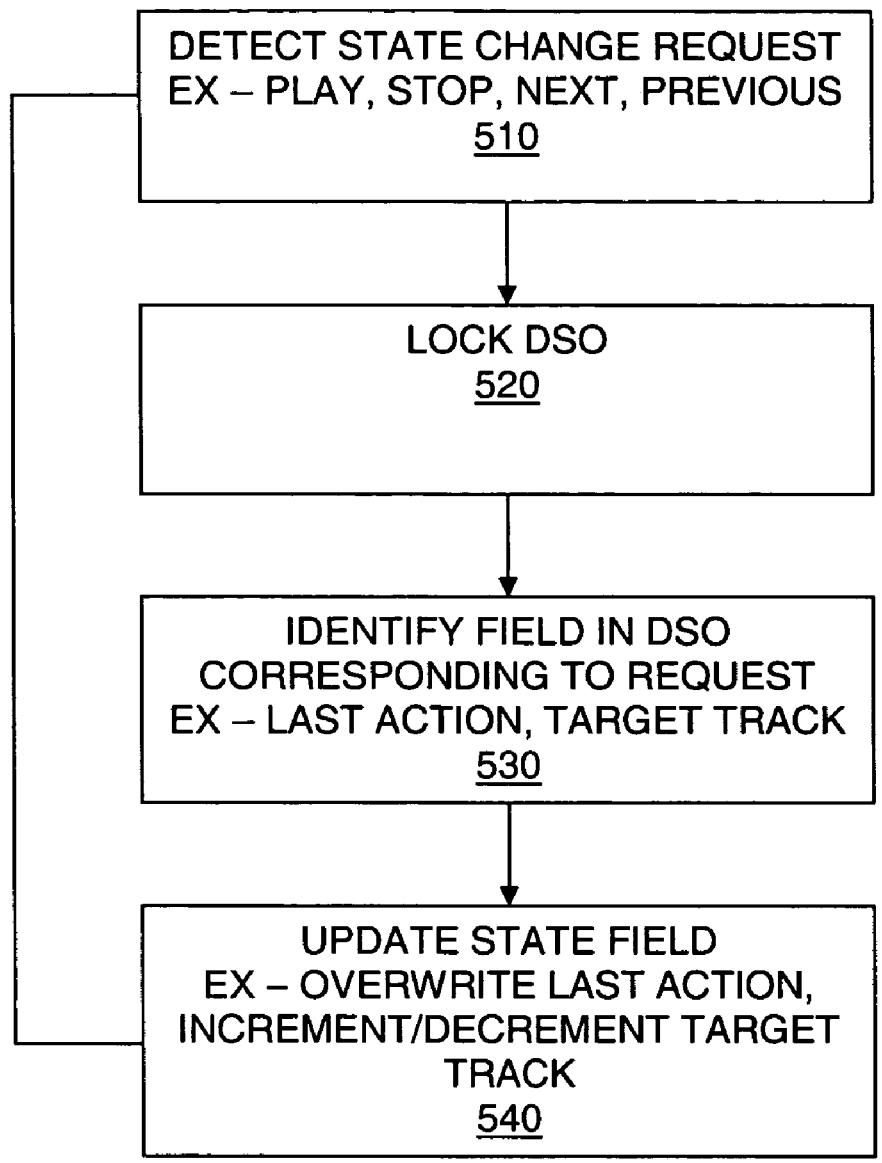

FIG. 5 illustrates one embodiment of a process for modifying the DSO. At 510, the process detects that a state change request has been received, such as a PLAY, STOP, NEXT, or PREVIOUS. At 520, the process locks the DSO to prevent a read while the process performs a write. At 530, the process identifies one or more fields in the DSO corresponding to the request. At 540, the process updates the identified field(s). The process can be repeated each time a state change request is received.

For example, if the request is PLAY, the process could identify a last action field and a target track field, and overwrite the contents of the last action field with PLAY and set the target track field to 1. Then, if a NEXT request is received, the process could overwrite the last action field with NEXT, and increment the target track to 2. If three more NEXT requests are received, the last action field could be overwritten three more times with NEXT, and the target track field could be incremented to 5. Then, if the network device becomes ready to change state, it can go directly to play track 5, skipping over the previous four requests.

Figure 6:
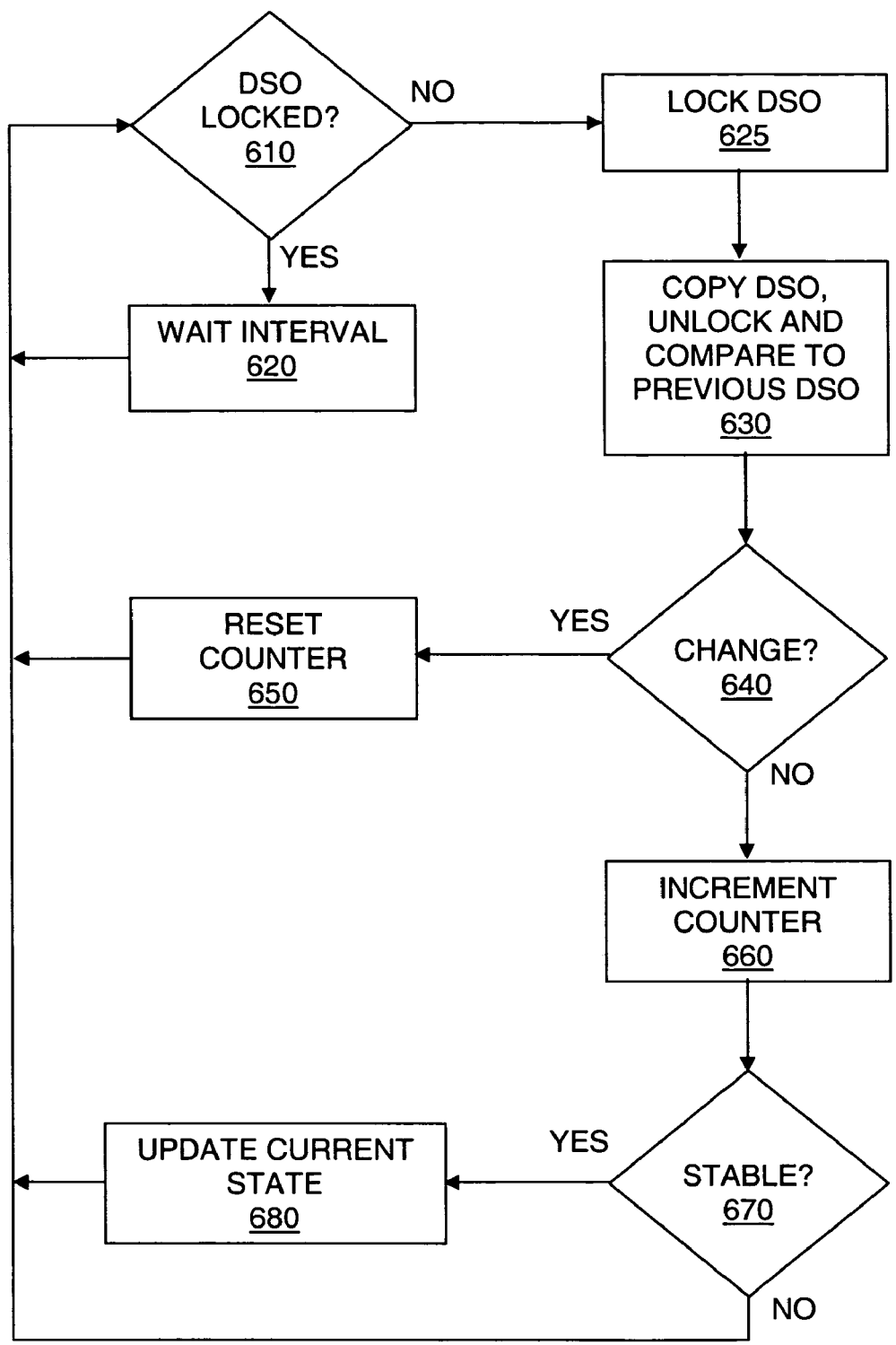

FIG. 6 illustrates one embodiment of a process for reading the DSO. In addition to protecting the DSO, the illustrated process waits for the DSO to stabilize before changing state. For example, if the DSO is in the process of being modified by a burst of requests, the illustrated process waits for the end of the burst. This can significantly improve performance. For instance, if the network device were ready and waiting for a state change request and a burst of 10 NEXTs was received, and if the network device immediately acted on the first request, the other 9 requests may all be received well before the network device is done with the first request. When it is done with the first request, the network device would have to change state again in response to the tenth request. In other words, two complete state change delays could be incurred. On the other hand, the response time could be significantly faster if the network device waited briefly for the end of the burst and then went straight to the tenth request.

At 610, the network device is ready to change state, so the process checks if the DSO is locked. If so, the process waits for a particular interval at 620 and then loops back to 610. When, the DSO is no longer locked, the process locks the DSO itself at 625 to prevent a write while the process reads. At 630, the process copies the DSO, unlocks it, and compares the copy to a previously copied DSO. If this is the first iteration of the process, there may be no previously copied DSO. In which case, at 640, when the process determines if the DSO has changed, the answer would be yes. At 650, the process resets a counter and loops back to 610.

When the process get to 640 a second time, there will be a previous cop of the DSO for comparison. If there is a change in the state, the counter is reset again in 650. As long as the state changes for each iteration through 640, the process does not act on the state change. In other words, the process assumes that a burst of requests is being received.

When there is no change between the current copy and the previous copy of the DSO, the process increments a counter at 660. Then, at 670, the process determines if the DSO is stabilized based on the value of the counter. That is, if the DSO has not changed in a particular number of iterations, the process assumes that the DSO has stabilized and goes to 680. At 680, the process updates the current state of the network device. For example, 680 could involve a process similar to thread 2 in FIG. 3. If the DSO has not stabilized at 670, the process loops back to 610 for another iteration.

In an alternate embodiment, the DSO may be considered stable if the DSO has not changed in just one iteration. In which case, elements 660 and 670 would not be needed.

Figure 7:
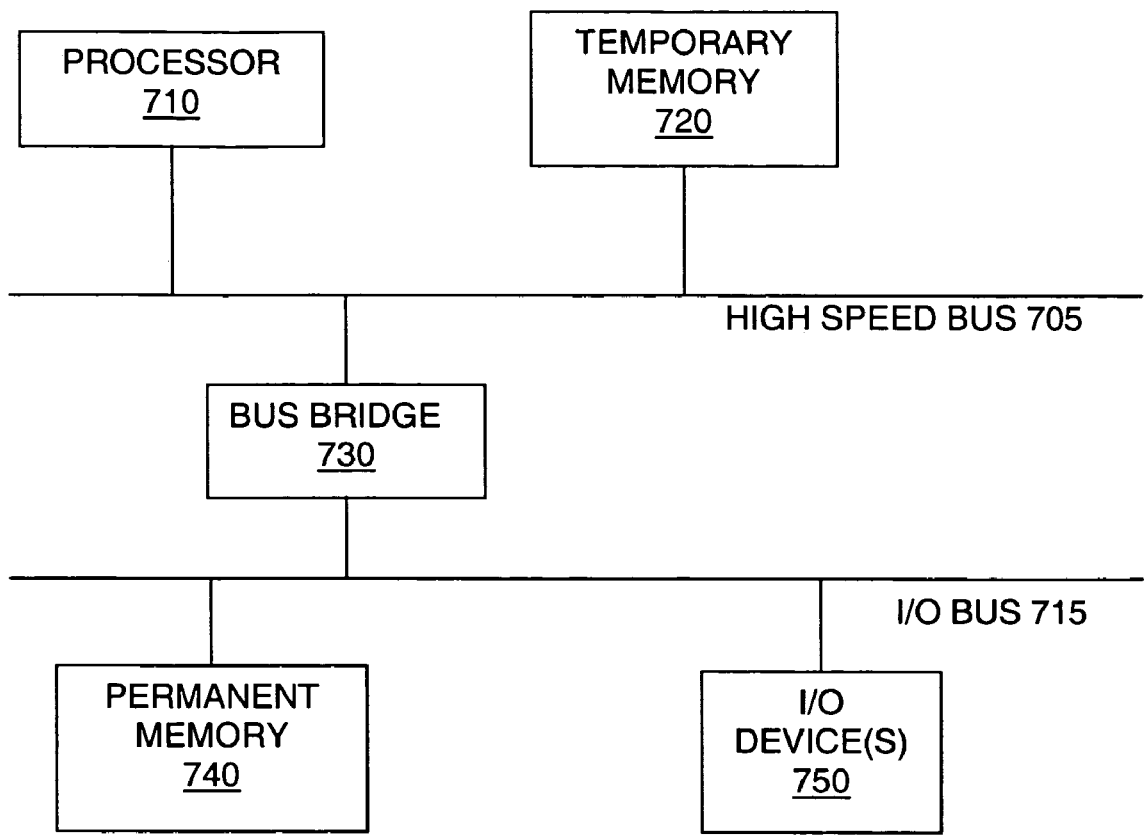
FIG. 7 illustrates one embodiment of hardware system that can perform various functions of the present invention.

FIG. 7 illustrates one embodiment of a generic hardware system intended to represent a broad category of computer systems such as personal computers, workstations, and/or systems embedded in any of a variety of devices, such as home theater components. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. I/O device(s) 750 is also coupled to bus 715. I/O device(s) 750 may include a display device, a keyboard, one or more external network interfaces, etc.

Certain embodiments may include additional components, may not require all of the above components, or may combine one or more components. For instance, temporary memory 720 may be on-chip with processor 710. Alternately, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, various functions of the present invention, as described above, could be implemented using one or more hardware systems such as the hardware system of FIG. 7. Where more than one computer is used, the systems can be coupled to communicate over an external network, such as a local area network (LAN), an internet protocol (IP) network, etc. In one embodiment, one or more functions of the present invention as described above may be implemented as software routines executed by one or more execution units within the computer(s). For a given computer, the software routines can be stored on a storage device, such as permanent memory 740.

Figure 8:
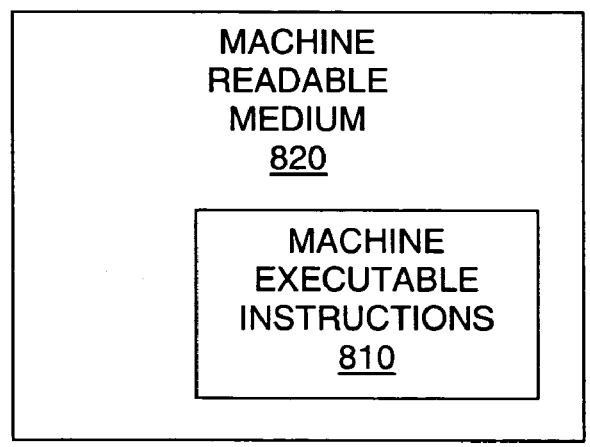
FIG. 8 illustrates one embodiment of a machine readable medium to store instructions that can implement various functions of the present invention.

Alternately, as shown in FIG. 8, the software routines can be machine executable instructions 810 stored using any machine readable storage medium 820, such as a hard drive, a diskette, CD-ROM, magnetic tape, digital video or versatile disk (DVD), laser disk, ROM, Flash memory, etc. The series of instructions need not be stored locally, and could be received from a remote storage device, such as a server on a network, a CD-ROM device, a floppy disk, etc., through, for instance, I/O device(s) 750 of FIG. 7.

From whatever source, the instructions may be copied from the storage device into temporary memory 720 and then accessed and executed by processor 710. In one implementation, these software routines are written in the C programming language. It is to be appreciated, however, that these routines may be implemented in any of a wide variety of programming languages.

In alternate embodiments, the embodiments of the present invention described above may be implemented in discrete hardware or firmware. For example, one or more application specific integrated circuits (ASICs) could be programmed with one or more of the above described functions. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a handler for state change requests is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
    receiving a serialized stream of state change requests over a network for a network device, said network device having a current state object representing a current state of the network device;
    modifying a desired state object with each of the state change requests in the serialized stream, said desired state object representing a desired state for the network device;
    reading an instance of the desired state object at a particular instant in time;
    comparing the instance of the desired state object to the current state object; and
    determining a set of tasks to change the current state of the network device to the desired state based on the comparison.

2. The method of claim 1 wherein receiving the serialized stream of state change requests comprises:
    storing the serialized stream to a queue as it is received;
    determining when the desired state object is locked; and
    providing the serialized stream from the queue only when the desired state object is not locked.

3. The method of claim 1 wherein modifying the desired state object comprises:
    detecting that a sequential state change request has been received from the serialized stream;
    locking the desired state object;
    identifying a state field in the desired state object corresponding to the sequential state change request; and
    updating the state field based on the sequential state change request.

4. The method of claim 1 further comprising:
    performing the set of tasks;
    updating the current state object;
    reading a next instance of the desired state object after the set of tasks are complete;
    comparing the next instance of the desired state object to the current state object; and
    determining a next set of tasks to change the current state of the network device to the desired state based on the comparison.

5. The method of claim 4 wherein performing the set of tasks comprises:
    executing one of a plurality of worker threads for each of the set of tasks, each of said plurality of worker threads corresponding to one of a plurality of states comprising the current state.

6. The method of claim 1 wherein reading the instance of the desired state object comprises:
    determining if the desired state object is locked; and
    waiting to read the next instance of the desired state object if the desired state object is locked.

7. The method of claim 1 wherein the network device comprises a Universal Plug and Play (UPnP) device.

8. The method of claim 7 wherein the UPnP device comprises a device executing a media renderer application.

9. The method of claim 1 wherein the network device comprises at least one of a television, a radio receiver, a digital versatile disk (DVD) player, a compact disk (CD) player, a video cassette recorder (VCR), an audio tape player, a personal computer, a personal data assistant, and a MP3 (Moving Picture Experts Group (MPEG)-1, Audio Layer 3) player.

10. The method of claim 1 wherein the network comprises at least one of the Internet, a wide area network, a local area network, and a system-level network within the network device.

11. The method of claim 1 wherein the serialized stream is received from a plurality of control points.

12. The method of claim 1 wherein the current state object comprises a first data structure having a first plurality of fields, each of the first plurality of fields corresponding to at least one of a plurality of state variables that collectively define the current state of the network device; and
    wherein the desired state object comprises a second data structure having a second plurality of fields corresponding to the first plurality of fields.

13. The method of claim 12 wherein reading the instance of the desired state object comprises copying the second data structure; and
    wherein comparing the instance of the desired state object to the current state object comprises comparing the first data structure and the copy of the second data structure.

14. The method of claim 1 wherein the current state object comprises actual states of a plurality of components comprising the network device; and
    wherein the desired state object comprises a plurality of state fields that correspond to the plurality of components.

15. The method of claim 14 wherein reading the instance of the desired state object comprises copying the plurality of state fields; and
    wherein comparing the instance of the desired state object to the current state object comprises determining any differences between contents of the copy of the plurality of state fields and the actual states of the plurality of components.

16. The method of claim 1 further comprising:
    determining that the desired state object has stabilized before determining the set of tasks to change the current state.

17. The method of claim 16 wherein determining that the desired state object has stabilized comprises:
repeating the reading and comparing until the DSO has not changed for a particular number of iterations.

18. The method of claim 1 wherein the set of tasks comprises multiple state changes.

19. The method of claim 1 wherein receiving the serialized stream and modifying the desired state object comprise a first thread, and wherein reading the instance of the desired state object, comparing the instance of the desired state object to the current state object, and determining the set of tasks comprise a second thread, the method further comprising:
executing the first thread and the second thread simultaneously.

20. The method of claim 1 wherein each of the state change requests in the serialized stream comprises one of a plurality of actions and/or one of a plurality of state variables corresponding to the network device.

21. The method of claim 20 wherein the plurality of actions comprise at least one of play, stop, pause, next, previous, increase/decrease volume, increase/decrease brightness, increase/decrease contrast, toggle mute, access playlist URI (universal resource identifier), increase/decrease red/black/green/blue levels, and increase/decrease play speed.

22. The method of claim 20 wherein the plurality of state variables comprise at least one of last action, track number, volume, brightness, contrast, mute, current playlist, red/black/green/blue levels, and play speed.

23. The method of claim 20 wherein the desired state object comprises a plurality of fields, each of said plurality of fields corresponding to one or more of the plurality of actions and the plurality of state variables.

24. The method of claim 23 wherein the plurality of fields comprise a last action field and a target track field, and wherein modifying the desired state object comprises:
overwriting the last action field with an action state variable from a given state change request if the given state change request includes the action state variable; and
incrementing or decrementing the target track field if the action state variable from the given state change request indicates a track change.

25. A machine readable medium having stored thereon machine executable instructions that, when executed, implement a method comprising:
receiving a serialized stream of state change requests over a network for a network device, said network device having a current state object representing a current state of the network device;
modifying a desired state object with each of the state change requests in the serialized stream, said desired state object representing a desired state for the network device;
reading an instance of the desired state object at a particular instant in time;
comparing the instance of the desired state object to the current state object; and
determining a set of tasks to change the current state of the network device to the desired state based on the comparison.

26. The machine readable medium of claim 25 wherein receiving the serialized stream of state change requests comprises:
storing the serialized stream to a queue as it is received;
determining when the desired state object is locked; and
providing the serialized stream from the queue only when the desired state object is not locked.

27. The machine readable medium of claim 25 wherein modifying the desired state object comprises:
detecting that a sequential state change request has been received from the serialized stream;
locking the desired state object;
identifying a state field in the desired state object corresponding to the sequential state change request; and
updating the state field based on the sequential state change request.

28. The machine readable medium of claim 25, the method further comprising:
performing the set of tasks;
updating the current state object;
reading a next instance of the desired state object after the set of tasks are complete;
comparing the next instance of the desired state object to the current state object; and
determining a next set of tasks to change the current state of the network device to the desired state based on the comparison.

29. The machine readable medium of claim 25 wherein reading the instance of the desired state object comprises:
determining if the desired state object is locked; and
waiting to read the next instance of the desired state object if the desired state object is locked.

30. The machine readable medium of claim 25, the method further comprising:
determining that the desired state object has stabilized before determining the set of tasks to change the current state.

31. A system comprising:
an audio component having a network port; and
a media renderer application to be executed by the audio component to implement a method comprising
receiving a serialized stream of state change requests over a network for a network device, said network device having a current state object representing a current state of the network device;
modifying a desired state object with each of the state change requests in the serialized stream, said desired state object representing a desired state for the network device;
reading an instance of the desired state object at a particular instant in time;
comparing the instance of the desired state object to the current state object; and
determining a set of tasks to change the current state of the network device to the desired state based on the comparison.

32. The system of claim 31, the method further comprising:
performing the set of tasks;
updating the current state object;
reading a next instance of the desired state object after the set of tasks are complete;
comparing the next instance of the desired state object to the current state object; and
determining a next set of tasks to change the current state of the network device to the desired state based on the comparison.

33. The system of claim 31 wherein the media renderer application comprises at least one of firmware and software.

* * * * *